United States Patent
Barthelme et al.

(10) Patent No.: US 11,703,092 B2
(45) Date of Patent: Jul. 18, 2023

(54) OUTER CONTACT SURFACE ELEMENT OF A ONE-WAY CLUTCH, ONE-WAY CLUTCH INCLUDING THE CONTACT SURFACE ELEMENT, AND METHOD FOR INSTALLING A ONE-WAY CLUTCH

(71) Applicant: AKTIEBOLAGET SKF, Gothenburg (SE)

(72) Inventors: Juergen Barthelme, Grettstadt (DE); Helmut Hauck, Euerbach (DE); Andreas Heile, Bad Kissingen (DE); Alexander Dilje, Schweinfurt (DE); Daniel Jansen, Schwebheim (DE); Manfred Mattes, Kolbingen (DE); Rainer Linder, Fridingen (DE); Rainer Spies, Donnersdorf (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/835,146

(22) Filed: Jun. 8, 2022

(65) Prior Publication Data

US 2022/0412413 A1 Dec. 29, 2022

(30) Foreign Application Priority Data

Jun. 24, 2021 (DE) .......................... 102021206567.8

(51) Int. Cl.
*F16D 41/28* (2006.01)
*F16D 41/063* (2006.01)
*B62M 6/40* (2010.01)

(52) U.S. Cl.
CPC ........... *F16D 41/28* (2013.01); *F16D 41/063* (2013.01); *B62M 6/40* (2013.01)

(58) Field of Classification Search
CPC .......... F16D 41/28; F16D 41/063; B62M 6/40
See application file for complete search history.

(56) References Cited

U.S. PATENT DOCUMENTS

| | | | |
|---|---|---|---|
| 4,013,327 A * | 3/1977 | Kunkel ................. | F16D 23/142 384/615 |
| 4,482,041 A * | 11/1984 | Ladin ...................... | F16C 33/66 384/612 |
| 4,519,488 A * | 5/1985 | Renaud .................. | F16D 23/14 384/617 |
| 5,460,253 A | 10/1995 | Ritter et al. | |
| 5,482,150 A | 1/1996 | Stark | |
| 7,690,488 B2 | 4/2010 | Ploetz et al. | |
| 2023/0034641 A1* | 2/2023 | Rauh ....................... | H02P 25/04 |

FOREIGN PATENT DOCUMENTS

| | | |
|---|---|---|
| DE | 4210560 C2 | 4/1998 |
| DE | 4134353 C2 | 5/2001 |
| DE | 102007006517 A1 | 8/2007 |

* cited by examiner

*Primary Examiner* — Colby M Hansen
(74) *Attorney, Agent, or Firm* — J-Tek Law PLLC; Scott T. Wakeman; Mark A. Ussai (57) ABSTRACT

An outer contact surface element of a one-way clutch is configured to contact at least one clamping body of the one-way clutch when an inner ring of the one-way clutch rotates in a first direction. The outer contact surface element includes a hollow-cylindrical section, and at least one radially outwardly projecting lug. The outer contact surface element may also include features for connecting the outer contact surface element to a support bearing.

19 Claims, 9 Drawing Sheets

OUTER CONTACT SURFACE ELEMENT OF A ONE-WAY CLUTCH, ONE-WAY CLUTCH INCLUDING THE CONTACT SURFACE ELEMENT, AND METHOD FOR INSTALLING A ONE-WAY CLUTCH

CROSS-REFERENCE

This application claims priority to German patent application no. 10 2021 206 567.8 filed on Jun. 24, 2022, the contents of which are fully incorporated herein by reference.

TECHNOLOGICAL FIELD

The present disclosure is directed to an outer contact surface element of a one-way clutch, a one-way clutch including the contact surface element, and a method for installing a one-way clutch.

BACKGROUND

One-way clutches are known, for example, as roller one-way clutches for the direction-dependent one-way-clutch braking function of a shaft relative to a housing. Prior art is, for example, a one-way roller clutch including a sleeve-shaped housing body (also called an outer ring). This sleeve body can be formed from sheet metal, wherein both ends of this body are formed by a radially inwardly formed edge whose side surface comes out very small for manufacturing technology reasons. In the non-locking state, each one-way roller clutch requires the additional support of a shaft. This is effected, for example, by two bearings. This unit is introduced axially into the housing, for example, using separate snap rings, and axially fixed by the snap rings acting on the small annular surface of the sleeve body.

Furthermore, one-way clutches, and in particular roller one-way clutches, are disclosed in the publications DE 10 2007 006 517 A1 (family member U.S. Pat. No. 7,690,488), DE 41 34 353 C2 (family member U.S. Pat. No. 5,460,253), and DE 42 10 560 C2 (family member U.S. Pat. No. 5,482,150). Sleeve one-way clutches are described in particular in a brochure originating from the company INA with the title "Hülsenfreiläufe".

SUMMARY

An object of the present invention is to provide an improved one-way clutch, or a correspondingly improved outer contact element of a one-way clutch, compared to the prior art, such that in particular the installation or connections of the one-way clutch to further elements of its installation environment are improved.

The disclosed solution allows a simple installation as a preassembled unit, wherein necessary support bearings, among other things, can be part of the preassembled unit. Furthermore, due to the radially outwardly protruding lug, for example, in flange-type design, an improved installation possibility arises of a one-way clutch in a housing, whereby due to the end side surface enlarged by the flange, a pressing into the housing with higher pressures is advantageously provided free of a risk of damage to the one-way clutch. An annealing, known from the prior art, of the contact surface element on its axial ends, which is necessary for the manufacturing of the inwardly directed beading, can also be omitted. A very cost-effective solution is thus provided overall with particular advantage.

The disclosure relates to an outer contact surface element, configured hollow-cylindrical at least in one axial section, of a one-way clutch. Clamping bodies of the one-way clutch contact the outer contact surface element.

The outer contact surface element is formed with at least one radially outwardly projecting lug. An installation or a connection of the one-way clutch to further elements of its installation environment can thereby be improved. In particular, the at least one lug makes it possible that during an installing of the one-way clutch into a housing and/or onto a shaft, a force, acting in the axial direction of the one-way clutch, can be applied to one or more surface or surfaces of the at least one lug, whereby damage to the outer contact surface element by the force is prevented due to the relatively large surface area of the surface or of the surfaces. This preventing of damage is an advantage in particular compared to an outer contact surface element of the prior art, which is formed on an axial end region including a beading. In particular, due to the presence of the lug or of the lugs for applying the force, a forming of a beading on an axial end of the outer contact surface element, and thus an annealing of a hardened region, can be omitted, which saves costs. In particular, in comparison to the formation with a beading, a greater force can be applied onto the outer contact surface element during the installation, whereby a more fixed press seat of the outer contact surface element in the housing can be achieved.

In particular, the outer contact surface element can be configured sleeve-shaped.

The lug is advantageously formed in an axial end region of the outer contact surface element, and the outer contact surface element is configured in this axial end region for connecting to at least one support bearing. In this way a constructively simple design can be achieved. In particular, in this axial end region the outer contact surface element can be formed for snap-connecting to the at least one support bearing, whereby a tool-free installing can be effected.

Furthermore, the clamping bodies are configured as rolling elements, whereby a cost-effective design can be achieved. In particular, the rolling elements can be embodied as cylindrical rollers.

The at least one support bearing can be configured as a plain or rolling-element bearing, in particular as a ball bearing or a deep groove ball bearing.

The outer contact surface element is advantageously formed one-piece from sheet metal and/or integrally from sheet metal. "One-piece" shall be understood in particular to mean from one casting and/or from one injection and/or only separable by destruction. A simple manufacturability can thereby be achieved. In particular, the sheet metal can be a steel sheet, whereby a very high hardness is achievable cost-effectively.

In addition, the axial end region of the outer contact surface element is formed for snapping in at least one snap-in lug formed on the outer casing of the support bearing. A particularly cost-effective forming of the snap connection can thereby be achieved.

Advantageously, the outer contact surface element is formed with an undercut in the axial end region on the inner casing side, as a result of which an element for snapping in the snap-in lug can be formed in a structurally simple manner.

Furthermore, the axial end region of the outer contact surface element includes at least one attachment element that engages in a recess, formed on the outer casing of the support bearing, to produce an interference-fit attachment. In this way a constructively simple design can be achieved. In particular, the at least one attachment element can be formed by radially inwardly projecting embossings on the inner casing of the outer contact surface element, whereby a secure attachment can be achieved.

The outer contact surface element advantageously includes a snap-connection formation in the axial end region, which snap-connection formation is configured with at least one radial penetration, in which correspondingly formed snap lugs of the support bearing are provided for snapping in. A simple attachment can thereby be achieved. In particular, the snap-connection formation can be formed including radial penetrations disposed distributed in the circumferential direction, in which radial penetrations correspondingly formed snap lugs of the support bearing are provided for snapping in, whereby a simple and very stable attachment can be achieved. In particular, the penetration or the penetrations can respectively be formed at a point having an axially outward extending expansion slit or expansion opening cutting through a wall of the of the contact surface element, whereby a flexibility needed during snapping in can be ensured.

Furthermore, lugs of the outer contact surface element, which lugs are distributed in the circumferential direction on the outer contact surface element, alternate with regions or portions of the contact surface element that are provided for a snap-connection formation. A very good attaching of the contact surface element can thereby be made possible, and simultaneously a very good attachment possibility to the outer contact surface element can be provided. In particular, the regions of the outer contact surface element that are provided for a snap-connection formation can respectively remain between the lugs. The regions provided for the snap-connection formation can advantageously protrude axially beyond the lugs or the lug regions, whereby an efficient installation-space use can be achieved.

The regions provided for the snap-connection formation and the lugs are advantageously generated by the contact surface element being provided with axial cuts or notches distributed on the axial end region in the circumferential direction, and a lug being generated by an outwardly bent region between two adjacent cuts. In this way a simple and cost-effective manufacturability can be achieved.

An axial end of the outer contact surface element is advantageously configured for abutting against a stop formed on the support bearing, whereby in an interacting with snap lugs of the support bearing, an interference-fit attaching of the support bearing to the contact surface element can be achieved. In particular, the stop can be formed by a projection extending in the radial direction on an outer casing of the support bearing.

Another aspect of the disclosure comprises a one-way clutch assembly includes a housing and an outer contact surface element mounted in the housing. The outer contact surface element is configured to contact at least one clamping body of the one-way clutch when an inner ring of the one-way clutch rotates in a first direction. The outer contact surface element includes a hollow-cylindrical section, and at least one radially outwardly projecting lug in contact with the housing. The outer contact surface element has a cylindrical outer surface, and an axial end of the cylindrical outer surface includes a plurality of axially extending notches each having a bottom, the notches being spaced apart by portions of the cylindrical outer surface. One of the at least one radially outwardly projecting lugs extends radially from the bottom of each of the notches, and each of the portions of the cylindrical outer surface includes a connection structure for connecting the outer contact surface element to a support bearing. A part of the support bearing extends into each of the plurality of notches, and the connection structure connects the outer contact surface element to the support bearing.

Furthermore, a method is proposed for installing a one-way clutch, in particular a one-way clutch as described above, wherein during the installation of the one-way clutch into an opening in a housing, a force is exerted on at least one radially outwardly projecting lug of the outer contact surface element of the one-way clutch. An installing or a connecting of the one-way clutch to further elements of its installation environment can thereby be improved. In particular, the applying of the force onto the at least one lug makes it possible to prevent damage to the contact surface by the force due to the relatively large surface area of the surface or of the surfaces of the at least one lug. In particular, due to the presence of the lug or of the lugs for applying the force, a forming of a beading on an axial end of the contact surface element, and thus an annealing of a hardened region, can be omitted, which saves costs.

Further advantages arise from the following description of the drawings. Exemplary embodiments of the invention are depicted in the drawings. The drawings, the description, and the claims contain numerous features in combination. The person skilled in the art will also advantageously consider the features individually and combine them into further meaningful combinations.

DETAILED DESCRIPTION

FIGS. 1 to 5 show a one-way roller clutch for direction-dependent one-way-clutch braking of a shaft 12 relative to a housing 14. The one-way clutch includes a sleeve-shaped outer surface element 50 formed as a hollow cylinder in axial section, which contact surface element is also referred to in short as an outer ring 40, and is disposed in the housing 14 in a press-fit manner. The outer ring 40 is thus attached to the housing 14 in a friction-fit manner with respect to its circumferential directions and also axially. Here the one-piece outer ring 40 is formed, for example, from sheet metal, wherein at the left axial end of the outer ring a radially inwardly extending edge 41 is formed that interacts with a correspondingly formed left support bearing 32, wherein support bearings 32 and 34 are needed to achieve an additional supporting of the shaft 12 in the non-locking state of the one-way clutch. Here the clamping bodies 22, configured as cylindrical rollers, of the one-way clutch are disposed in a cage 24 of the one-way clutch. Here in a known manner, not depicted in more detail, the inner casing of the outer ring 40 among other things is correspondingly configured for realizing the locking state of the one-way clutch. In addition, the one-way clutch includes a number of springs (not depicted) corresponding to the number of clamping bodies 22, which springs are respectively supported on the cage 24 and the clamping bodies 22, and which ensure a spring-loading of the clamping bodies 22. When the one-way clutch is in the locking state, the clamping bodies 22 contact the contact surface element. The support bearings 32, 34 are part of the one-way clutch.

Figure 1:
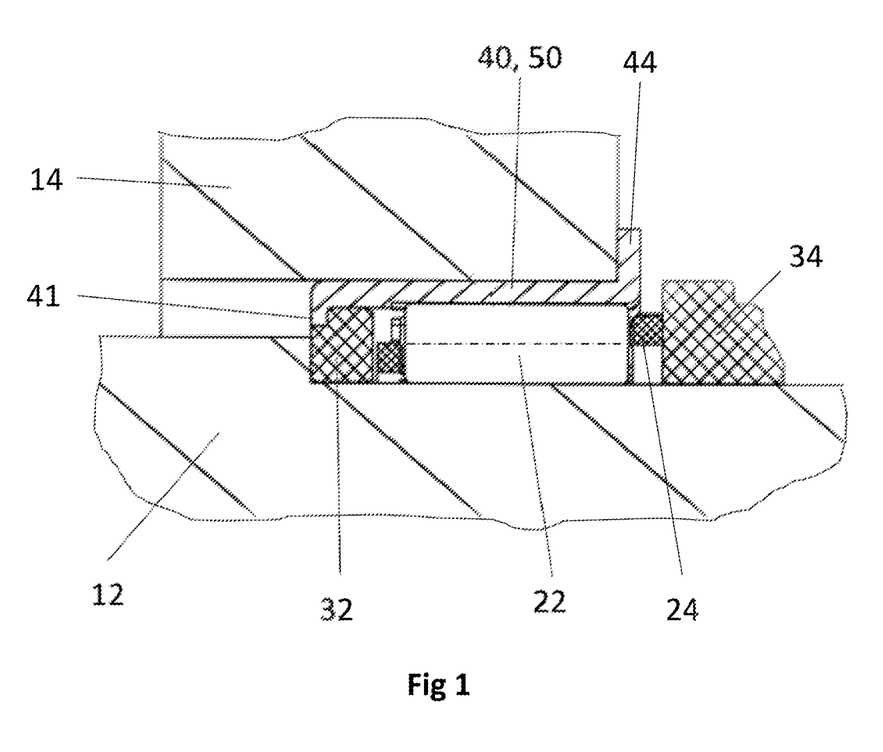
FIG. 1 is an axial section through an assembly that includes a first embodiment of a one-way clutch according to the present disclosure that is installed between a shaft and a housing.
Figure 2:
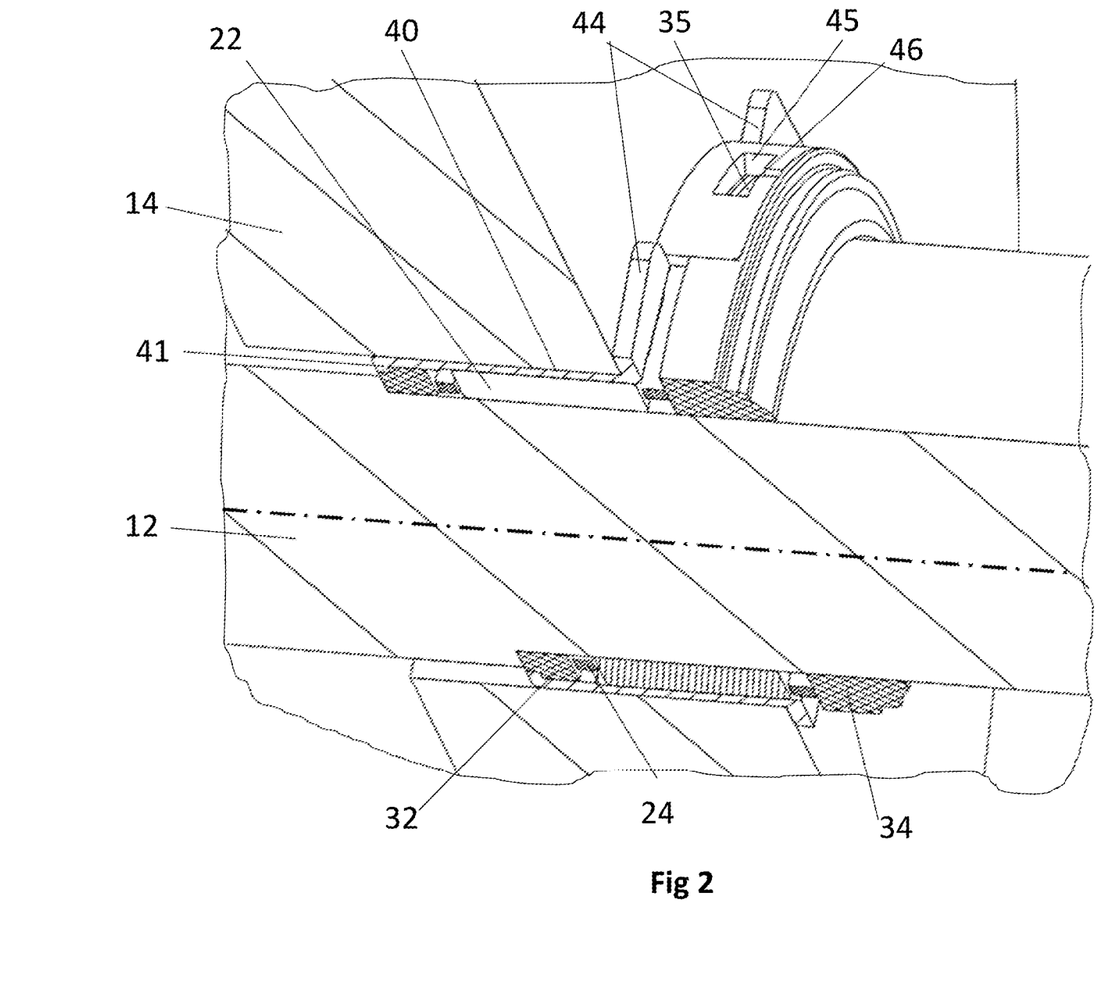
FIG. 2 is a perspective view, partly in section, through the assembly of FIG. 1.
Figure 5:
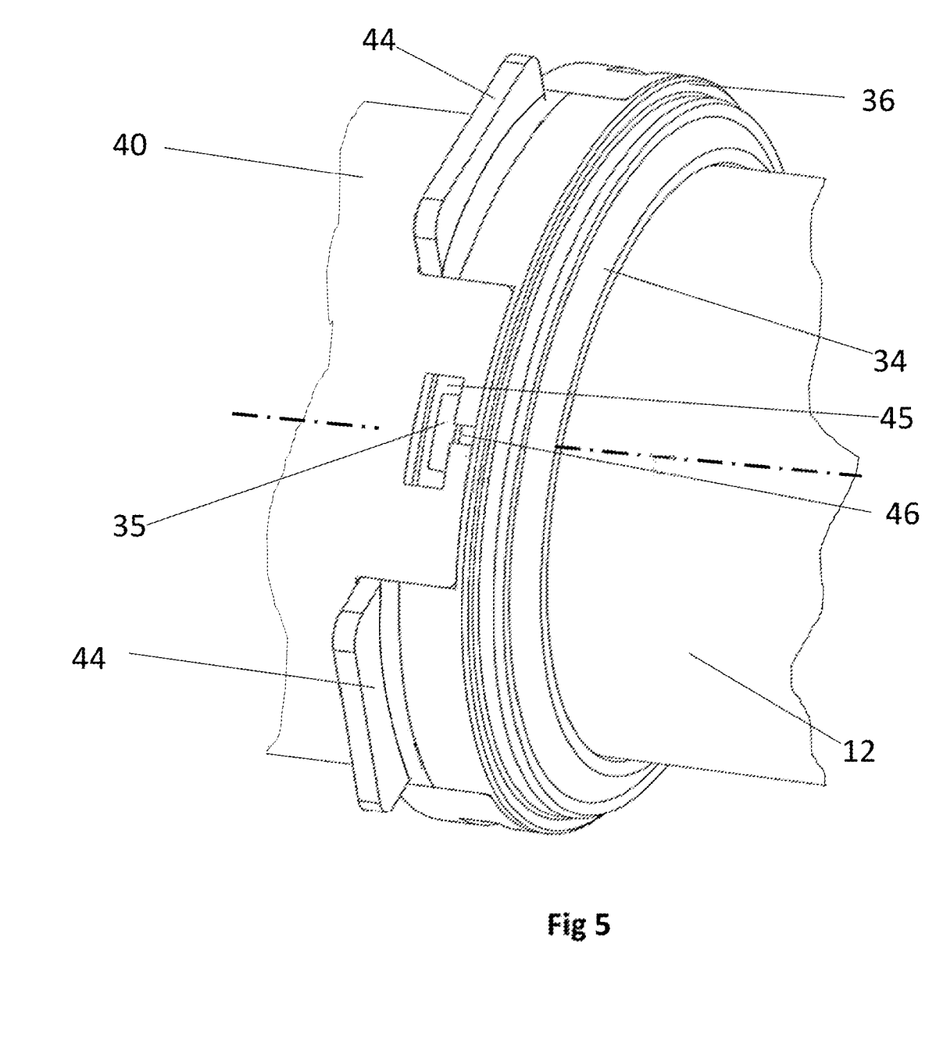
FIG. 5 is a perspective view of the assembly of FIG. 1 without the housing.

On the right axial end, the outer ring 40 includes a flange formed from a plurality of radially outwardly projecting lugs 44. In order to integrate the necessary right-hand support bearing 34, the segments remaining between the lugs 44 of the segmented flange are used for connecting to the support bearing 34. A snap connection is preferably provided on the remaining segments, wherein in other embodiments other connection types such as interference-fit, material-bonded, or friction-fit are also possible. In the present exemplary embodiment a snap connection is realized on each of the remaining segments. The remaining segments extend in the axial direction and in the circumferential direction. Viewed in the circumferential direction of the outer ring 40, one of the remaining segments always follows one of the lugs 44, and one of the lugs 44 always follows one of the remaining segments. Consequently the lugs 44 and the remaining segments alternate in the circumferential direction. Furthermore, the remaining segments are partially disposed in recesses of the support bearing 34 that extend radially inwardly in the circumferential direction and in the axial direction (compare FIG. 2). The remaining segments are thereby attached to the support bearing 34 in an interference-fit manner in the circumferential direction. In addition, due to these recesses of the support bearing 34, an incorrect assembling during a preassembling of the one-way clutch is prevented, since to attach the support bearing 34 to the outer ring 40, the remaining segments must protrude into the recesses of the support bearing 34.

Figure 3:
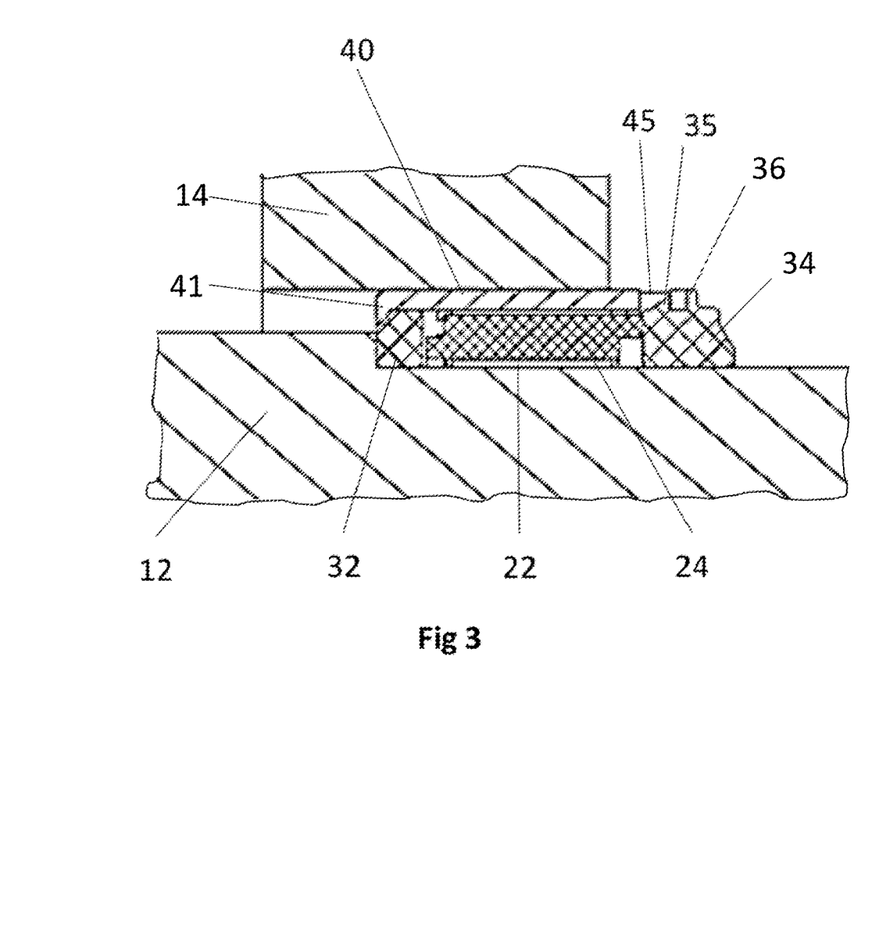
FIG. 3 is another sectional view through the assembly of FIG. 1 in which a snap lug is shown.
Figure 4:
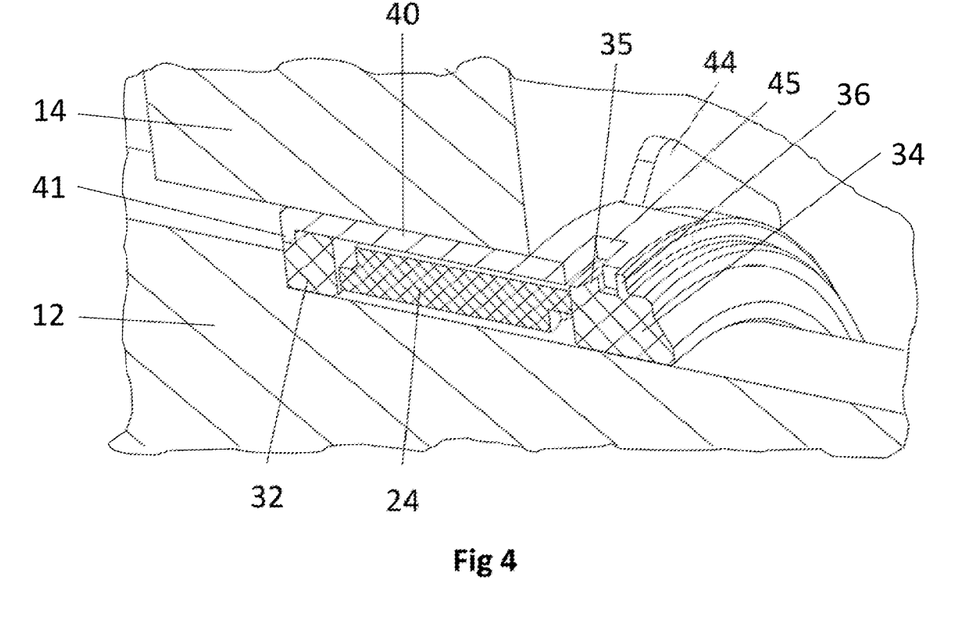
FIG. 4 is a perspective view of the region of FIG. 3.

The snap connection is comprised of at least one snap lug 35 that is adapted or integrated on the right support bearing 34. Here this snap lug 35 and the support bearing 34 are preferably embodied one-part. The snap lug 35 and an outer ring of the support bearing 34 can be formed one-piece, in particular from plastic. Alternatively the snap lug 35 can also be overmolded onto the outer ring of the support bearing 34. Furthermore, the right support bearing 34 includes a stop that fixes the bearing 34 together with the snap lug 35 in both axial directions. Here the stop is formed by a closed ring 36 disposed in the circumferential direction, wherein in other embodiments stop elements can also be distributed along the circumference. The ring 36 is part of the outer ring of the support bearing 34.

Furthermore, the snap connection in the outer ring 40 is realized by at least one radial penetration 45 preferably introduced directly in the outer ring. This penetration 45 is a through-hole extending in the radial direction of the outer ring 40 and includes at least the area and the design as defined by the snap lugs 35 of the right support bearing 34. In order to ensure the necessary flexibility of the outer ring 40 in the region of the snap connection, wherein the outer ring 40 is usually hardened and is therefore only slightly elastic, the penetration 45 is configured in a shape that allows it to ensure the elastic deformation of the outer ring 40, which elastic deformation is necessary for the snapping in of the snap ring 35. This is realized by an expansion opening 46, wherein in other embodiments, other functionally similar designs can also be used.

During a preassembling of the one-way clutch, the support bearing 32 is first pressed into the outer ring 40. The clamping bodies 22, the cage 24, and the springs are then introduced into the outer ring 40. Finally, the support bearing 34 is attached to the outer ring 40 as described above. The one-way clutch is then preassembled and forms a self-retaining unit whose parts are captively attached to one another. Expense is thus saved during a final assembling of the one-way clutch.

During an installation of the one-way clutch in the housing 14, a force pointing in the axial direction is applied by an annular tool onto the lugs 44, and the outer ring 40 thereby pressed into the housing 14 until the lugs 44 strike against the housing 14. Since the surface to which the axial force is applied is relatively large, damage to the lugs 44 is prevented. Due to the presence of the lugs 44 onto which the axial force is applied, the support bearing 34 can furthermore be configured such that it is built approximately as high radially as the axial section 50 of the outer ring 40.

A connecting of the shaft 12 to the one-way clutch can be effected after an installing of the one-way clutch in the housing. Here the corresponding part of the shaft is pressed into the inner rings of the support bearings 32, 34.

When the one-way clutch is preassembled but not yet installed in the housing and not installed on the shaft, the edge 41 prevents the support bearing 32 from falling out of the outer ring 40 away from the lugs 44 by an interference-fit attaching of the support bearing 32 with respect to the respective axial direction of the outer ring 40.

The support bearings 32, 34 are plain bearings. Alternatively it is conceivable that the support bearing 32 or the support bearing 34 is a rolling-element bearing. In other exemplary embodiments, both support bearings 32, 34 can also be rolling-element bearings.

The one-way clutch, the housing 14, and the shaft 12 can be part of a bicycle including an electric motor. Here the shaft 12 can be a drive shaft of the electric motor.

In one alternative embodiment, the lugs 44 can be disposed in recesses of the housing 14 so that the lugs 44 and thus the outer ring 40 are attached to the housing 14 in an interference-fit manner in the circumferential direction.

Alternative exemplary embodiments are depicted in FIGS. 6 to 9. Essentially identical components, features, and functions are generally numbered with the same reference numbers. However, to differentiate the exemplary embodiments the letters "a" and "b" are added to the reference numbers of the exemplary embodiments of FIGS. 6 to 9. The following description is essentially limited to the differences relative to the exemplary embodiment in FIG. 1 to FIG. 5, wherein with respect to components, features, and functions remaining the same, reference can be made to the description of the exemplary embodiment in FIG. 1 to FIG. 5.

Figure 6:
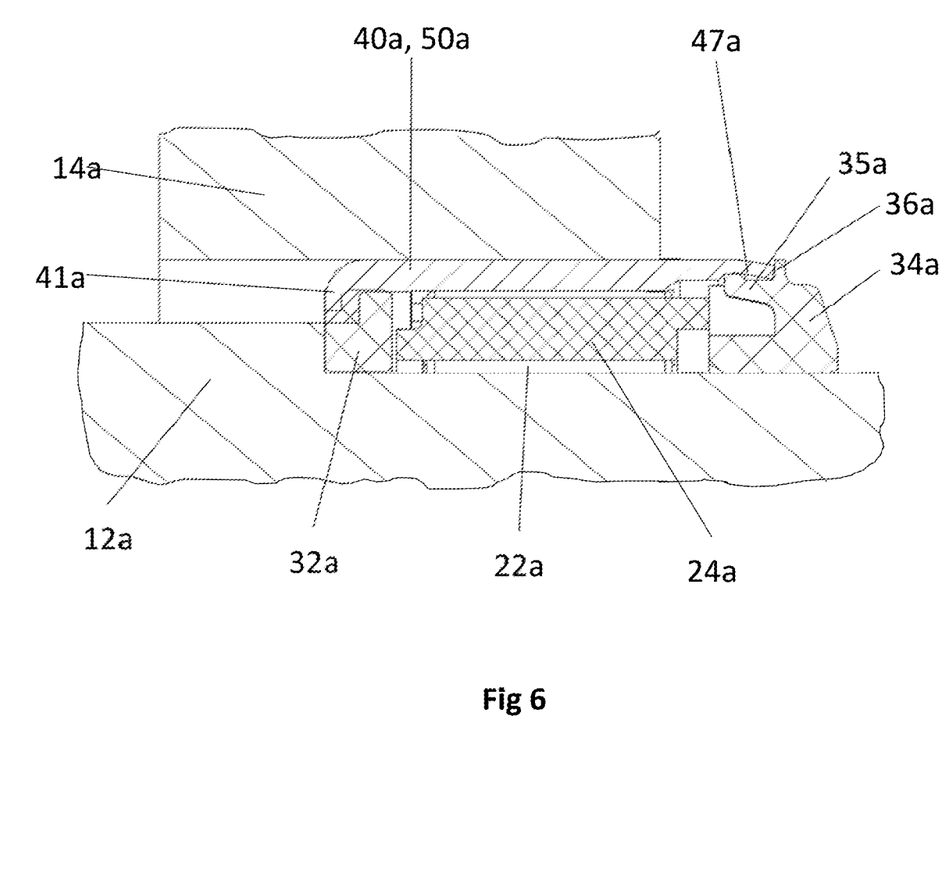
FIG. 6 is an axial section of an assembly that includes a second embodiment of a one-way clutch according to the present disclosure that is installed between a shaft and a housing.
Figure 7:
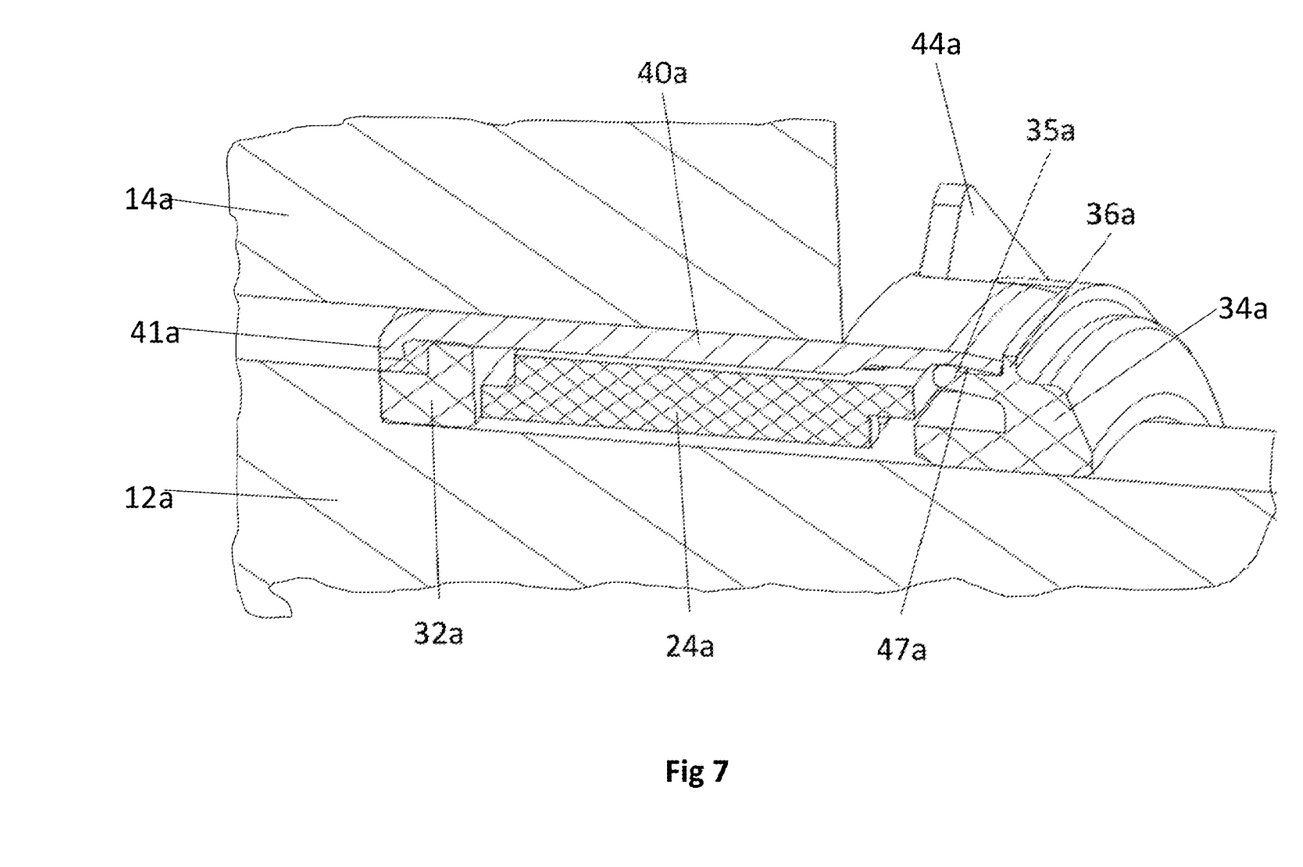
FIG. 7 is a perspective view, partly in section, through the assembly of FIG. 6.

The second embodiment of the invention according to FIGS. 6 and 7 differs from the first embodiment of the invention according to FIGS. 1 to 5 by a different formation of the snap connection. Also in FIGS. 6 and 7, the at least one snap lug 35a is also integrated into the right-hand support bearing 34a. Here the corresponding counter-contour for the snap connection is realized by a local forming of the outer ring 40a such that there is at least one undercut 47a on the inner side of the outer ring 40a into which undercut the snap lugs 35a of the support bearing 34a can engage. As shown in particular in FIG. 6, a further component can be disposed between the support bearing 32a and the outer ring 40a in the radial direction of the outer ring 40a. However, this further component is preferably absent, and the corresponding spatial area is taken by the support bearing 32a.

Figure 8:
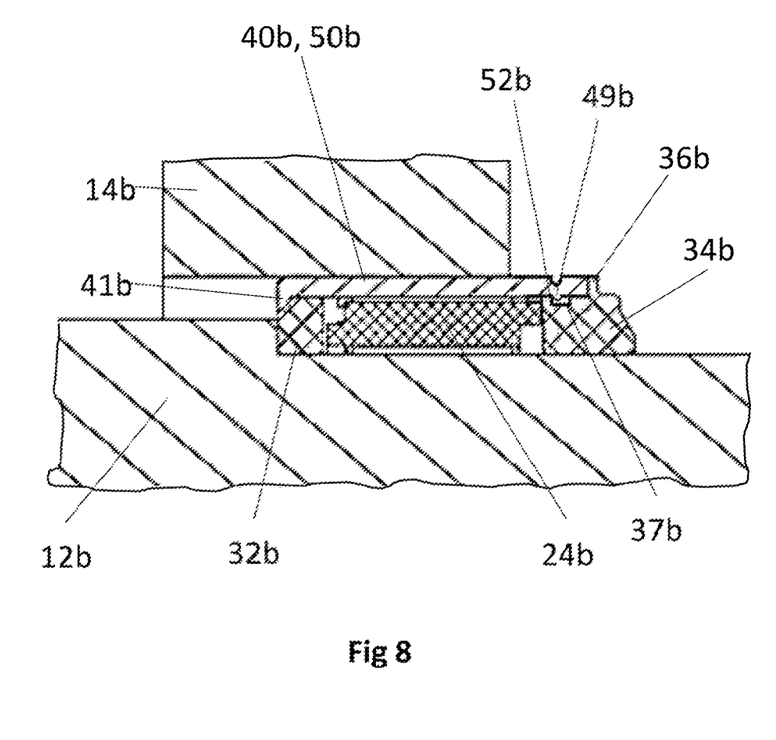
FIG. 8 is an axial section of an assembly that includes a third embodiment of a one-way clutch according to the present disclosure that is installed between a shaft and a housing.
Figure 9:
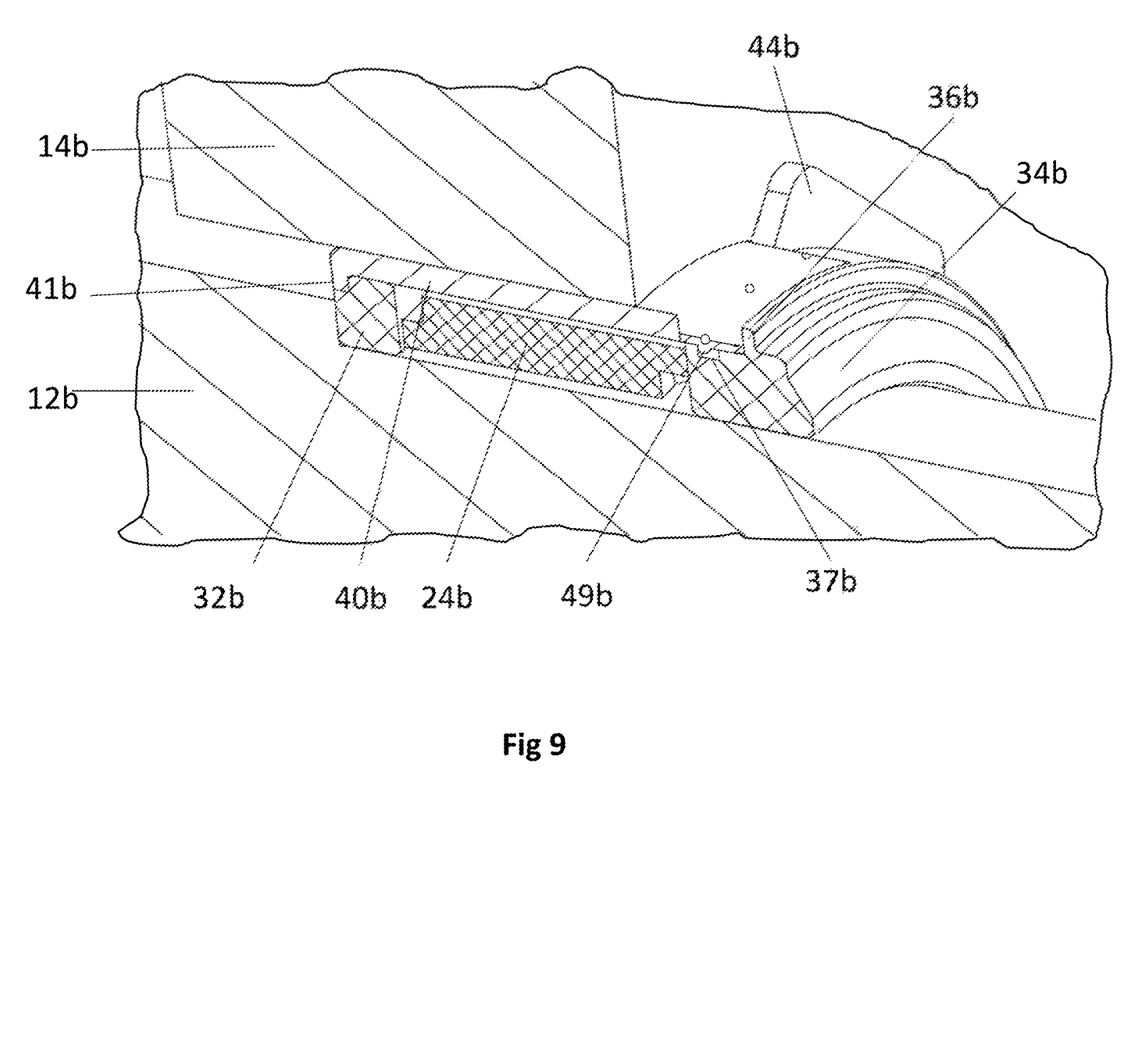
FIG. 9 is a perspective view, partly in section, of the assembly of FIG. 8.

The third embodiment of the invention according to FIGS. 8 and 9 differs from the first and second embodiments by the snap connection being realized reversed, so to say. The at least one snap lug 49b is now integrated in the outer ring 40b. This snap lug 49b is preferably formed from the outer ring 40b by a forming process, with the Figures showing a realization by means of radial embossings distributed over the outer ring 40b in the circumferential direction. The associated recess 37b is now located in the support bearing 34b, and is realized in the Figures as a ring groove extending in the circumferential direction. The snap lug 49b is thus snapped into an undercut 52b formed on the outer casing of the support bearing 34b.

A fourth embodiment of the invention differs from the third embodiment of the invention only by the embossings, which form the snap lugs 49b in the third embodiment, being embodied deeper and thus no longer suitable for snapping into the recess 37b. These deeper embossings are only introduced into the contact surface element when the contact surface element and the respective support bearing that includes the mentioned recess have been brought into their final position relative to each other. Due to the engaging of the embossings into the recess, a connection only separable by destruction is provided between the contact surface element and the support bearing, which connection ensures a particularly secure attaching.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved one-way clutches.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

12 Shaft
14 Housing
22 Clamping body
24 Cage
32 Support bearing
34 Support bearing
35 Snap lug
36 Ring
37 Recess
40 Outer ring
41 Edge
44 Lug
45 Penetration
46 Expansion opening
47 Undercut
49 Snap lug
50 Axial section
52 Undercut

What is claimed is:

1. An outer contact surface element of a one-way clutch configured to contact at least one clamping body of the one-way clutch when an inner ring of the one-way clutch rotates in a first direction,
wherein the outer contact surface element includes a hollow-cylindrical section, and
wherein the outer contact surface element includes at least one radially outwardly projecting lug.

2. The outer contact surface element according to claim 1, wherein the outer contact surface element is formed one-piece and/or integrally from sheet metal.

3. The outer contact surface element according to claim 1, wherein the at least one lug is formed at an axial end region of the contact surface element.

4. The outer contact surface element according to claim 3, wherein the axial end region includes connection means for connecting the outer contact surface element to a support bearing.

5. The outer contact surface element according to claim 4, wherein connection means includes an opening for receiving at least one snap-in lug formed on the support bearing.

6. The outer contact surface element according to claim 4, wherein the connection means includes at least one projection configured to engage into a recess formed on the support bearing to produce an interference-fit connection.

7. The outer contact surface element according to claim 1, wherein the at least one lug comprises a plurality of circumferentially spaced lugs, and
wherein a snap-connection region is located between each adjacent pair of the plurality of circumferentially spaced lugs.

8. The outer contact surface element according to claim 1, wherein the outer contact surface element includes a cylindrical outer surface,
wherein an axial end of the outer contact surface element includes a plurality of axially extending notches each having a bottom, the notches being spaced apart by portions of the cylindrical outer surface,
wherein one of the at least one radially outwardly projecting lug extends radially from the bottom of each of the notches, and
wherein each of the portions of the cylindrical outer surface includes connection means for connecting the outer contact surface element to a support bearing.

9. The outer contact surface element according to claim 8, wherein the connection means comprises an opening in each of the portions of the cylindrical outer surface.

10. The outer contact surface element according to claim 9,
including a notch extending from each of the openings to an axial end surface of the outer contact surface element.

11. The outer contact surface element according to claim 8,
wherein the connection means comprises an undercut configured to receive a projecting portion of the support bearing.

12. The outer contact surface element according to claim 8,
wherein the connection means comprises a projection configured to be received in a recess on the support bearing.

13. A one-way clutch assembly including:
a housing,
an outer contact surface element according to claim 8 mounted in the housing with the at least one radially outwardly projecting lug in contact with the housing,
the bearing inner ring,
the at least one clamping body located between the bearing inner ring and the contact surface element, and
the support bearing, the support bearing being configured to guide the at least one clamping body,
wherein a part of the support bearing extends into each of the plurality of notches, and
wherein the connection means connects the outer contact surface element to the support bearing.

14. The one-way clutch according to claim 13,
wherein the connection means comprises an opening in each of the portions of the cylindrical outer surface.

15. The one-way clutch according to claim 13,
wherein the connection means comprises at least one undercut configured to receive a projection of the support bearing.

16. The one-way clutch according to claim 13,
wherein the connection means comprises a projection configured to be received in a recess on the support bearing.

17. A one-way clutch including an outer contact surface element according to claim 1.

18. A bicycle including an electric motor and a one-way clutch according to claim 17, wherein the one-way clutch is coupled to a shaft of the electric motor.

19. A method for installing the one-way clutch according to claim 17, comprising:
inserting an end of the outer contact surface element into an opening in a housing; and
applying an axial force against the at least one radially outwardly projecting lug to move the outer contact surface element further into the opening in the housing until the at least one radially outwardly projecting lug contacts the housing.

* * * * *